F. S. HOLLEY.
THRESHING MACHINE.
APPLICATION FILED SEPT. 23, 1908.
917,434.
Patented Apr. 6, 1909.
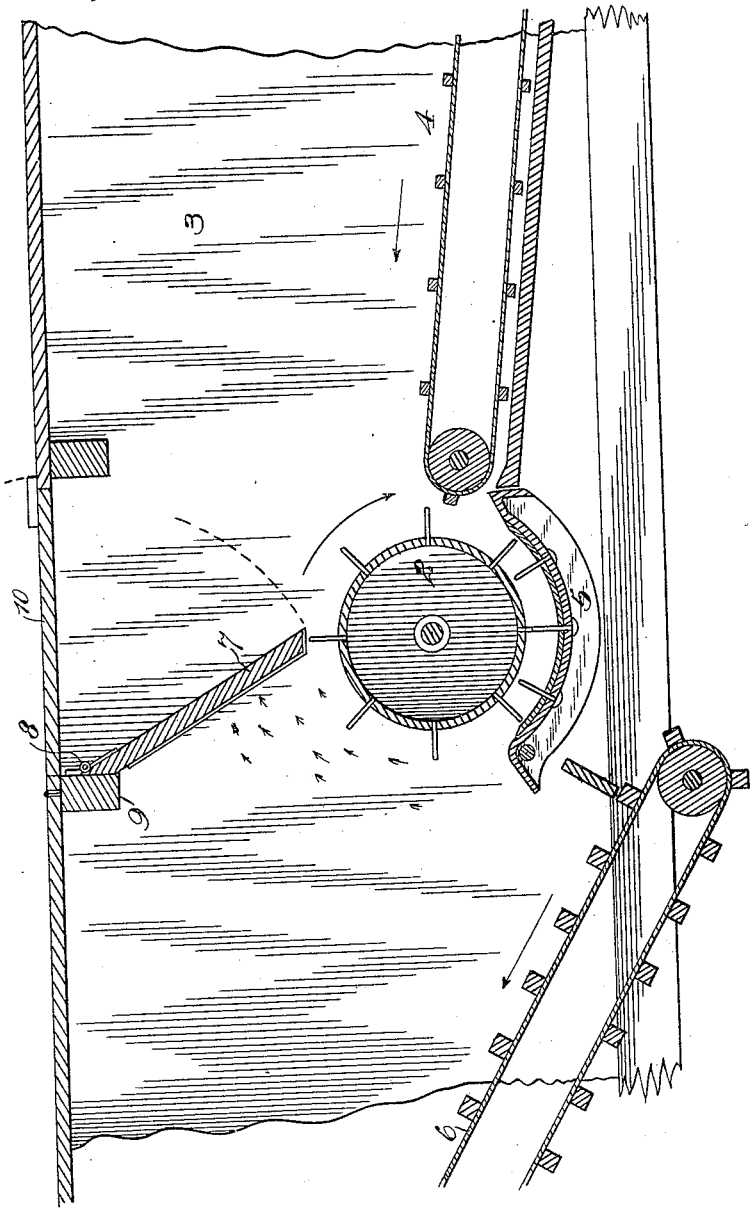
WITNESSES
F. E. Maynard,
Charles A. Penfield.
INVENTOR,
Frank S. Holley;
BY Geo. H. Strong.
his ATTORNEY

UNITED STATES PATENT OFFICE.

FRANK S. HOLLEY, OF STOCKTON, CALIFORNIA.

THRESHING-MACHINE.

No. 917,434.  Specification of Letters Patent.  Patented April 6, 1909.

Application filed September 23, 1908. Serial No. 454,372.

*To all whom it may concern:*

Be it known that I, FRANK S. HOLLEY, citizen of the United States, residing at Stockton, in the county of San Joaquin and State of California, have invented new and useful Improvements in Threshing - Machines, of which the following is a specification.

This invention relates to threshers, harvesters and the like, and particularly to the feeding and threshing mechanism thereof.

An important object of my invention is to provide a movable and yielding guard which will prevent the material under treatment from unduly wearing away the housing of the machine, will prevent a jam of grain-straw in the feed-house, and will permit such straw as may follow the cylinder around, to disentangle itself. It also allows convenient access to the threshing mechanism, without dismounting any permanent parts.

Other objects will become apparent.

My invention consists of parts, and the construction and combination of parts, and will be more fully explained by reference to the accompanying drawings, in which—the figure is a central section of the feed-house and cylinder of a thresher.

Heretofore all threshing-machines of the undershot type, to my knowledge, have been provided with fixed bars and caps, called cut-offs. The former is located to the rear of the cylinder, while the cap is above, and both just clear the teeth of the cylinder. These cut-offs are rigid, and when a mass of straw becomes tangled in the teeth, instead of being able to free itself through centrifugal force, it is packed all the harder by the fixed caps, thus preventing a steady in-feed and causing a jam.

The cylinder 2 is located at the lower rear side of the feed-house 3, and receives grain-laden straw from the feed-belt 4. The rapidly revolving toothed cylinder, after having drawn the material through the concave 5, throws the straw and loosened grain to the cell- or slat-belt 6 by which it is conveyed to the separator, not here shown.

It frequently happens that grains and straw follow the cylinder, escaping the usual cut-off, and are tangentially thrown off, and impact with considerable force, against the top of the feed-house, causing much damage. To prevent this, I provide a suitable means, here shown as a hanging plate or guard 7, adapted to be swung upwardly about the hinges 8 secured to the cross-frame 9. The lower end of the guard is arranged approximately over the center of the cylinder, and offers normally sufficient resistance to arrest the grain and prevent wear of the feed-house top and front. Occasionally, long straw winds or packs around the cylinder, and in this instance the guard will yield, by swinging, to such extent as will allow the straw to pass and gradually return to the feed side of the cylinder, and at the same time does not allow any grain to be thrown forcibly against the roof of the feed-house.

It is obvious that, by my construction, access may be had to the cylinder by simply opening the trap-door 10 and then swinging up the guard 7. This is not possible in any of this class of machines, as constructed with fixed posts and attachments, in the usual manner. Thus, I not only provide a more accessible machine, but also a cheaper one, by omitting the housing and frame timbers ordinarily used to support the parts, and providing a swinging or otherwise suitable guard mounted so as to be movable.

Having thus described my invention, what I claim and desire to secure by Letters Patent is—

1. In a threshing-machine, the combination with an under-shot cylinder, and feeding means therefor, of a cut-off guard and stop having its lower end disposed substantially over the center of the cylinder, and proximate to the circle described by the cylinder teeth said guard and stop adapted to prevent the grain and straw being returned over the top of the cylinder and being hingedly secured whereby it may yield substantially in the direction of the travel of the upper part of said cylinder.

2. In a threshing-machine, the combination of a concave, an under-shot cylinder operable thereover, and feeding and straw-carrying means, of a yielding cut-off located above the cylinder in a plane between the feeding and straw carrying means and having its lower end arranged in proximity to the circle described by the cylinder teeth, said cut-off adapted to yield in an upward direction and serving to prevent the grain and straw being returned over the top of said cylinder.

3. In a threshing-machine, the combination of a concave, an undershot cylinder operable thereover, and feeding and straw-carrying means, of an inclosing housing having a fixed cut-off guard at the front, and a hinged, swinging guard suspended directly above and in proximity to the cylinder and adapted to prevent the grain and straw being
5 returned over the top of said cylinder, said guard adapted to yield in an upwardly and forwardly direction.

In testimony whereof I have hereunto set my hand in presence of two subscribing witnesses.

FRANK S. HOLLEY.

Witnesses:
Y. S. JOHNSON,
A. F. HARRISON.